Sept. 15, 1953 J. WICKS 2,652,456

NONNUMERICAL TELEPHONE SWITCHING ARRANGEMENT

Filed Nov. 26, 1949 2 Sheets-Sheet 1

INVENTOR.
JOHN WICKS

BY [signature]

ATTORNEY

INVENTOR.
JOHN WICKS

BY

Chas. W. Candy

ATTORNEY

Patented Sept. 15, 1953 2,652,456

UNITED STATES PATENT OFFICE 2,652,456

NONNUMERICAL TELEPHONE SWITCHING ARRANGEMENT

John Wicks, Biloxi, Miss., assignor to Automatic Electric Laboratories, Inc., Chicago, Ill., a corporation of Delaware Application November 26, 1949, Serial No. 129,625

10 Claims. (Cl. 179—27.52)

The present invention relates in general to switching apparatus, and more particularly to improvements in switching apparatus of the non-numerical type primarily for use in automatic and semi-automatic telephone systems.

It is an object of the invention to provide an improved switching arrangement whereby a plurality of non-numerical lineswitches are associated with a plurality of subscribers' line circuits, and a multiple field of bare conductors is associated with a plurality of trunk circuits, new and novel means being included so that any subscriber's line circuit can be automatically connected to a free trunk circuit in the multiple field of bare conductors.

Another object of the invention is to provide a novel non-numerical lineswitch for use in association with a multiple field of bare conductors so that connections of one set of circuit conductors can be established to another set of circuit conductors in a simple and efficient manner.

A further object of the invention is to provide a new and improved non-numerical lineswitch which is economical to manufacture and simple to maintain.

A still further object of the invention is to provide new and novel means for preventing any non-numerical lineswitch in the group from connecting with more than one circuit in the multiple field of bare conductors at one time.

Another object of the invention is to provide a new and novel "master" switch for use in association with a group of non-numerical lineswitches to automatically align all idle lineswitches of the group with a free circuit in the multiple field of bare conductors.

A feature of the invention, in addition to the inclusion of a simple trunk circuit multiple field consisting of bare conductors, resides in the also relatively inexpensive arrangement of the subscribers' line circuit conductors. Each line circuit conductor comprises a metallic strip spanning the multiple field conductors, but having no normal electrical connections therewith, and a conductor member depending from the metallic strip for a corresponding bare conductor of each trunk circuit in the multiple field, these depending conductor members being adapted to be pressed into electrical contact with the respective trunk circuit conductors in the multiple field. Each such conductor strip and its depending conductor members are stamped from a single piece of electrical conducting material, preferably spring stock, and, therefore, the strip serves to multiple the depending conductor members together so that no multiple wiring is required therefor.

Another feature of the invention relates to the provision of a switching arrangement wherein a plurality of sets of movable conducting elements representing a subscriber's line circuit are arranged in co-operative relationship with a plurality of sets of stationary conducting elements representing respective trunk circuits, novel mechanical means controlled by the functioning of the non-numerical lineswitch of the subscriber's line circuit being provided for urging a particular one of the sets of movable conducting elements into electrical contact with the corresponding set of stationary conducting elements.

A further feature of the invention is the inclusion of novel means for always returning the trunk connecting units associated with the subscribers' line circuits to the normal non-operated positions upon the release of previously established connections, thereby enabling the trunk circuits to be "graded" without the use of special apparatus to obtain a higher percentage of trunking than that permitted by the regular number of ungraded trunk circuits.

There are other objects and features of the invention having to do for the most part with the details in carrying out the foregoing. The various objects and features of the invention will be understood best upon a further perusal of the specification in connection with the accompanying drawings which show a preferred embodiment of the invention.

Referring now to the drawings.

Figures 1, 2:
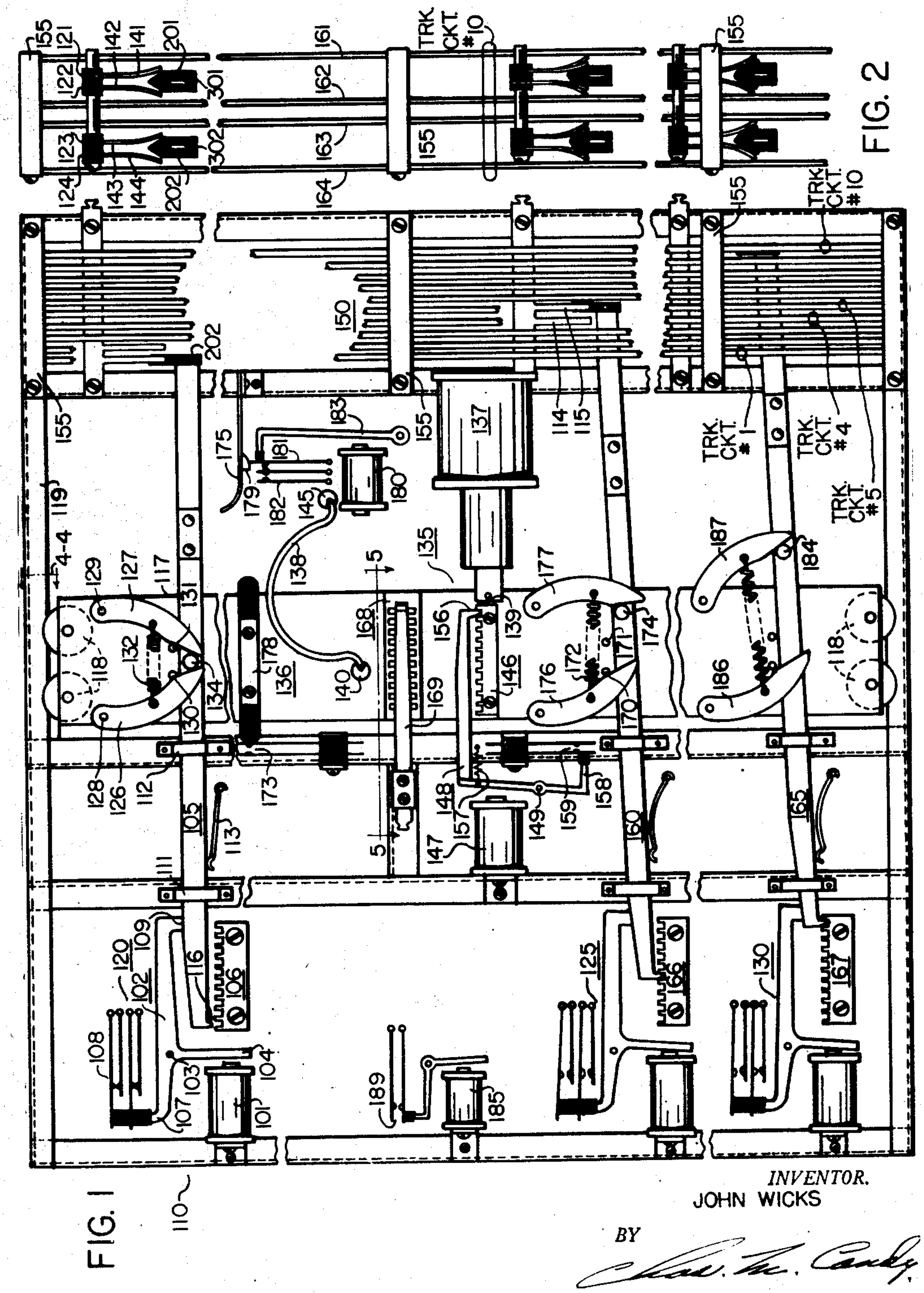
Figure 1 is a front view, in elevation, of the switching arrangement showing the trunk circuit multiple field of bare conductors to the right, three non-numerical lineswitches to the left, and a "master" switch for controling, or directing, the lineswitches at the center.
Figure 2 is an end view, in elevation, of the switching arrangement shown in Figure 1.

Referring more particularly to Figure 1, there is illustrated three non-numerical lineswitches designated 120, 125, 130, one common master switch designated 135, and a multiple field of bare conductors comprising trunk circuits and identified by the reference character 150, all mounted in a co-operative relationship on a frame generally identified by the reference character 110. The frame 110 may be of any suitable construction but is not shown completely in detail in order to simplify the drawing, it being considered unnecessary for the purpose of illustrating the application of the present invention to detail such well-known structural devices as suitable framings, bearings and mountings for the various switching apparatus units.

Frame 110 may include mounting space for any number of non-numerical lineswitches, one non-numerical lineswitch being associated with each subscriber line circuit, limited only to the desired maximum height of the frame. The vertical members of frame 110 are shown broken to indicate this flexibility.

The trunk circuit multiple field 150 includes forty vertically disposed conductors mounted in four-conductor groups comprising, for example, 10 trunk circuits. This multiple field of bare conductors is located at the right-hand end of frame 110, as shown in Figure 1. The four conductors of trunk circuit #1 are identified as conductors 151, 152, 153, 154, in Figure 3, and the four conductors of trunk circuit #10 as conductors 161, 162, 163 and 164. It is obvious that each trunk circuit may include more than four conductors or less than four conductors, and also that the number of trunk circuits may be less or more than ten, according to need or preference. The vertically disposed bare conductors are insulatingly secured to the bottom horizontal member of frame 110 in any suitable manner and then pass through correspondingly aligned holes in insulating support members, such as 155, suitably spaced and mounted on vertical members of frame 110, until the top horizontal member of frame 110 is reached. At this point the conductors rise above the top horizontal member of frame 110 where they are connected to terminals (not shown) or wiring (not shown) according to circumstance. The bare conductors are held rigidly in the holes of the support members 155 by friction or other suitable means, and serve as wiper contacts for the bare spring conductors (wipers) of the line circuits mounted horizontally across the multiple field. The vertically disposed bare conductors, such as 151—154, 161—164, consist of stiff bare wires or other suitable material ,and may be of round, square, rectangular or other cross section.

In order that any line circuit may be connected to any trunk circuit of trunk circuits #1 to #10 inclusive, each line circuit includes four horizontally disposed conductors, such as 121, 122, 123, 124, mounted across the multiple field of trunk circuit bare conductors but having no normal connecting therewith. The four horizontally disposed conductors of each line circuit are suitably insulated from each other and from frame 110, each assembly of four conductors and associated insulating strips being rigidly held in position on frame 110 by means of screws or other suitable device.

Each line circuit horizontally disposed conductor, such as 121 (Figure 2), has 10 vertically disposed and spaced conductor members, such as 141, depending therefrom, each depending member being located adjacent one vertically disposed bare conductor of each of the 10 trunk circuits #1 to #10 inclusive, and said vertically disposed conductor of each trunk circuit being the same relative conductor of all the trunk circuits. Each horizontally disposed conductor, such as 121, and its 10 depending members, such as 141, are stamped from a single piece of metal spring material and, therefore, the horizontal conductor serves to multiple the 10 depending members together. In Figure 1, the outside vertically disposed conductors of trunk circuits #4 and #5 are broken away to show the vertically disposed depending members 114 and 115 respectively associated with the outside conductors of trunk circuits #4 and #5.

The vertically disposed depending conductors, such as 141 (Figure 2), are so tensioned that in the normal, or non-operated, position the free ends are close to but clear of the related vertically disposed trunk circuit conductors, such as 161. When the four vertically disposed line circuit conductors associated with one of the trunk circuits are flexed in the manner to be described presently, the free ends of said line circuit conductors are pressed into sliding engagement with the four bare vertically disposed conductors of the particular trunk circuit. The right-hand end of each horizontally disposed line circuit conductor, such as 121, is pierced or otherwise arranged to form a terminal (Figure 1) to which line circuit wiring (not shown) may be attached.

Figures 6, 7:
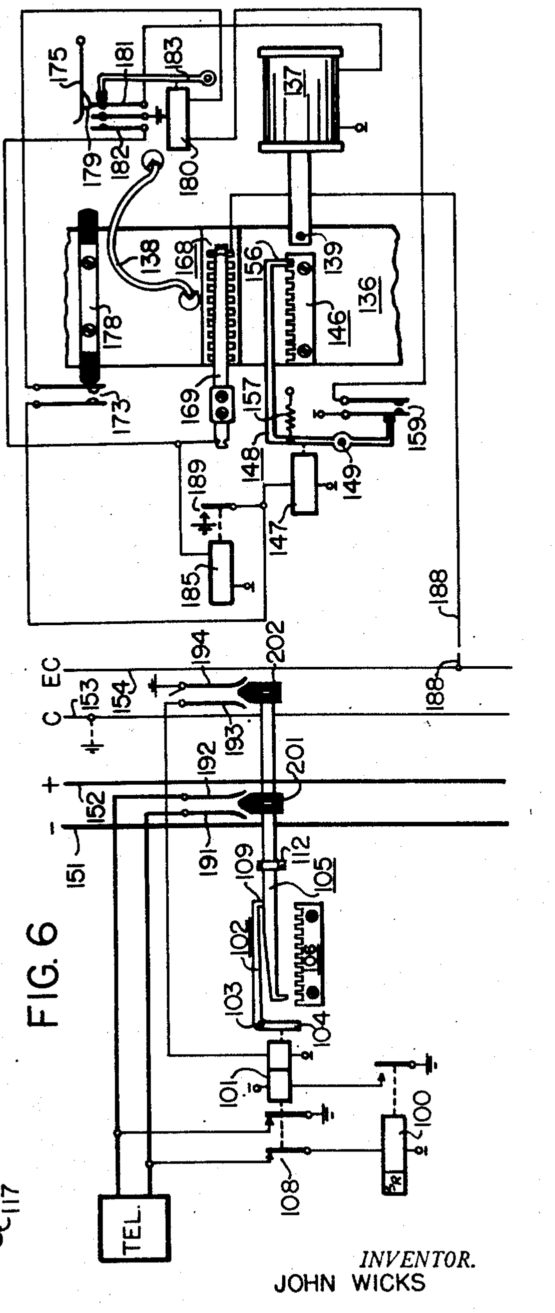
Figure 6 is a simplified circuit diagram of one subscriber's line circuit and the associated nonnumerical lineswitch together with one trunk circuit of four bare conductors.
Figure 7 is a simplified circuit diagram of the master switch mechanism for causing the master switch to preselect another free trunk circuit in the multiple field responsive to the extension of a call over one of the subscriber's line circuits to the previously preselected trunk circuit.

As previously indicated, non-numerical lineswitches terminate the subscriber line circuits, one lineswitch being associated with each line circuit. In Figure 1, lineswitch 120 provides for one line circuit, lineswitch 125 for another line circuit, and lineswitch 130 for a third line circuit. The purpose of the lineswitch is to provide means whereby the associated line circuit can be connected to a free trunk circuit of trunk circuits #1 to #10 inclusive, upon the initiation of a call over the line circuit. Figure 6 shows a typical wiring arrangement of the line circuit and the associated lineswitch, and Figures 1, 2 and 3 show the mechanical arrangement of the lineswitch.

Each lineswitch, such as 120, comprises an electromagnet 101 rigidly mounted on a member of frame 110, a three-member armature 102 mounted on frame 110 in any suitable manner and so pivoted at 103 that member 104 of the armature is located in operative relationship with the core of magnet 101, a linear lever assembly 105, and a toothed rack 106 mounted on frame 110 in a suitable manner for locking lever assembly 105 in any operated position under control of armature 102. Member 107 of armature 102 controls a contact spring assembly 108, and member 109 locks lever assembly 105 in any selected tooth position of rack 106. Lever assembly 105 which may be of any suitable metallic material, preferably non-magnetic, is slidingly mounted on frame 110 by means of bearings 111 and 112. Bearing 112 also permits a pivoted movement of lever assembly 105, and bearing 111 a down and up movement of lever assembly 105. Spring 113 suitably mounted on frame 110 normally retains lever assembly 105 in an up position which holds pawl 116 of lever assembly 105 clear of rack 106. Additional bearings, such as 111, may be provided for lever assembly 105 if desired. Other well-known suitable types of bearings can be employed equally as well as bearings 111 and 112.

Figure 3:
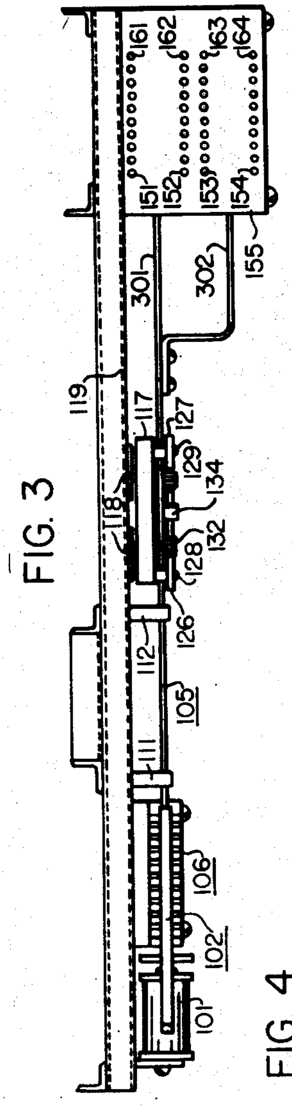
Figure 3 is a top view, in elevation, of the switching arrangement shown in Figure 1.

The right-hand end of lever assembly 105 forms into two branches 301 and 302 (best seen in Figure 3). Branch 301 is adapted to pass between the inside row of vertically disposed conductors of trunk circuit multiple field 150 and the adjacent row of vertically disposed conductors from left to right and vice verso, under control of master switch 135, in a plane just below the free ends of the related vertically disposed line circuit conductors, and terminates in a wedge-shaped actuator 201 (Figure 2) of insulating material. Similarly, branch 302 is adapted to pass between the outside row of vertically disposed conductors of trunk circuit multiple field 150 and the adjacent row of vertically disposed conductors, and terminates in a wedge-shaped actuator 202 of insulating material. Actuators 201 and 202 are shown aligned with the vertically disposed line circuit conductors associated with conductors 151—154 of trunk circuit #1, in a position to urge free ends of the vertically disposed line circuit conductors into sliding contact with conductors 151—154 of trunk circuit #1. By proper linear movements of lever assembly 105, however, actuators 201 and 202 can be aligned with the vertically disposed line circuit conductors associated with the vertically disposed conductors of the other trunk circuits in multiple field 150.

It should be understood at this time that the number of branches of each line circuit lever assembly and the number of associated wedge-shaped actuators would vary in accordance with the number of vertically disposed conductors of the trunk circuits in multiple field 150. For example, if there were only two vertically disposed conductors for each trunk circuit in the multiple field, then each lineswitch lever assembly would terminate in only one actuator such as 201, and if there were six vertically disposed conductors for each trunk circuit, then there would be three branches and three actuators associated with the lever assembly of each line switch.

In Figures 1 and 3, lever assembly 105 is shown in the position where its actuators 201 and 202 are aligned with the vertically disposed line circuit conductors associated with the vertically disposed conductors 151—154 of trunk circuit #1 and, therefore, when magnet 101 of lineswitch 120 is energized, actuators 201 and 202 are caused to press the four vertically disposed conductors of the line circuit into sliding contact with the four conductors 151—154 of trunk circuit #1. The manner in which actuators 201 and 202 are caused to connect the four conductors of the line circuit with the four conductors 151—154 of trunk circuit #1 is as follows:

Pawl 116 at the extreme left-hand end of lever assembly 105 is opposite the first tooth (corresponding to trunk circuit #1) of rack 106, and is held clear of this tooth by the pressure of spring 113 which forces and retains the upper edge of lever assembly 105 firmly against the upper limit of bearing 111, lever assembly 105 pivoting in bearing 112. The section of lever assembly 105 to the right of bearing 112 correspondingly is in its lowest position, thus retaining actuators 201 and 202 in the normal, or non-operated positions. It should be noted that rack 106 is fitted with 10 teeth, each tooth corresponding to one of the 10 trunk circuits in multiple field 150.

Now assuming that magnet 101 of lineswitch 120 becomes energized, then member 104 of armature 102 is attracted towards the core of magnet 101. This causes member 109 of armature 102 to exert sufficient pressure against lever assembly 105 to overcome the power of spring 113, thus forcing pawl 116 down into the first tooth of rack 106. Pawl 116 is slightly tapered downwardly to facilitate its entrance into the tooth of rack 106. At the same time, member 107 of armature 102 moves upwardly to operate contact spring assembly 108. As a result of the downward movement of the left-hand section of lever assembly 105, lever assembly 105 pivots in bearing 112 and the right-hand section of lever assembly 105 correspondingly moves in an upward direction, thereby driving actuators 201 and 202 upwardly between the four vertically disposed line circuit conductors associated with trunk circuit #1. The wedge shapes of actuators 201 and 202 cause the four vertically disposed line circuit conductors to move outwardly into sliding contacts with the vertically disposed bare conductors 151—154 of trunk circuit #1. The four vertically disposed line circuit conductors remain in electrical contact with conductors 151—154 of trunk circuit #1 as long as magnet 101 is energized.

In order that lever assembly 105 may connect the associated line circuit with any one of trunk circuits #2 to #10 inclusive as well as with trunk circuit #1, master switch 135 (under control of certain circumstances to be explained later in this specification) is employed to move lever assembly 105 from left to right and from right to left so that actuators 201 and 202 may be aligned with another trunk circuit in multiple field 150 other than trunk circuit #1.

Master switch 135 comprises essentially a movable carriage 136 (Figure 1) adapted to be moved from left to right and from right to left on rails formed from, or attached to, the top and bottom members of frame 110 (the distance between the left-hand location limit and the right-hand location limit of carriage 136 being substantially equal to the distance across the vertically disposed conductors of multiple field 150), a solenoid 137 for pulling carriage 136 from the left-hand location limit to the right-hand location limit and a power spring 138 for driving carriage 136 from the right-hand location limit to the left-hand location limit. In addition, controlling means (to be identified later) are associated with master switch 135 for stopping carriage 136 at any desired trunk circuit position intermediate the left-hand location limit and the right-hand location limit.

Figure 4:
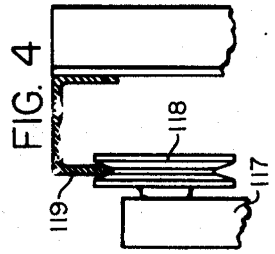
Figure 4 is a fragmentary cross-section taken along the line 4—4 in Figure 1 to show the relationship of one of the rollers of the master switch carriage with a rail of the mounting frame.

Referring again to Figure 1, master switch carriage 136 consists primarily of a vertically positioned flat metallic plate 117 equipped with rollers 118 at its upper and lower ends. These rollers 118 are rotatively bearinged in plate 117 in any suitable manner, the top rollers 118 movably engaging a rail formed from, or attached to, the top member of frame 110, and the bottom rollers 118 movably engaging a rail formed from, or attached to, the bottom member of frame 110. Figure 4, taken along the line 4—4 in Figure 1, shows a suitable rail formed from the top member of frame 110, and also indicates how one roller 118 rotatively engages rail 119. Any suitable well-known adjusting method can be employed for adjusting rollers 118 of carriage 136 so that carriage 136 moves freely between the top and bottom rails of frame 110 without bind or undesired looseness.

It should also be understood at this time that the particular roller and rail arrangement shown in Figures 1 and 4 is for illustrative purposes primarily, as any well-known arrangement for providing a smooth and efficient linear movement of carriage 136 can be utilized equally as well. It should be further understood that base plate 117 of carriage 136 need not be one continuous solid metallic plate, as it can be made from a number of vertical and horizontal members of suitable structural shapes welded or otherwise assembled together to form a suitable light-weight base for carriage 136.

Solenoid 137 of master switch 135 provides the motive power for moving carriage 136 from the left-hand location limit to the right-hand location limit, and power spring 138 the motive power for moving carriage 136 from the right-hand location limit to the left-hand location limit. Solenoid 137 is suitably mounted on frame 110 to the right of carriage 136 (Figure 1), and its moving element is attached to carriage 136 by means of pin 139. One end of power spring 138 is anchored to frame 110 by means of bearing post 145 suitably mounted on a member (not shown) of frame 110 to the right of carriage 136, and the other end of spring 138 is anchored to carriage 136 by means of bearing post 140 suitably secured to carriage 136. Solenoid 137 moves carriage 136 to the right by direct pull against the increasing tension of power spring 138, and power spring 138 drives carriage 136 to the left (solenoid 137 de-energized).

In order that the linear movements of carriage 136 shall be smooth and without violence, carriage 136 is fitted with a governor (not shown) for regulating the speed of operation. A suitable type of governor for this purpose is shown in Figure 8 of Patent No. 1,185,510 issued to A. E. Keith on May 30, 1916, and described in lines 35-43 on page 3 of the same patent. Any other suitable well-known type of governor may be employed equally as well for regulating the linear speed of carriage 136.

An escapement is associated with master switch 135 for controlling the linear movements of carriage 136. This escapement comprises essentially a toothed rack 146 (having one tooth for each of the 10 trunk circuits #1 to #10 inclusive) suitably secured to carriage 136 and a lock magnet 147 and associated armature 148 suitably mounted on a member of frame 110 to the left of carriage 136. Armature 148 is pivoted at 149 in operative relationship with the core of lock magnet 147, and spring 157 retains armature 148 normally retraced from the core of lock magnet 147. Pawl 156 of armature 148 normally engages a tooth of rack 146, thus locking carriage 136 against linear movement. In Figure 1, pawl 156 engages the tooth representing trunk circuit #1, and it should be noted that the teeth of rack 146 are counted from right to left, as armature 148 is located to the left of carriage 136. Member 158 of armature 148 controls a contact spring assembly 159.

When lock magnet 147 is energized, armature 148 operates and removes pawl 156 from rack 146. Carriage 136 is now free to move as long as lock magnet 147 remains energized. Now if solenoid 137 is energized while lock magnet 147 remains energized, then solenoid 137 will pull carriage 136 from the left-hand location limit of Figure 1 to the right-hand location limit which represents trunk circuit #10. At this point, solenoid 137 becomes de-energized in a manner to be explained later and, should lock magnet 147 still remain energized, then power spring 138 will drive carriage 136 from the right-hand location limit to the left-hand location limit which represents trunk circuit #1. On the other hand, should both solenoid 137 and lock magnet 147 become de-energized when carriage 136 reaches the right-hand location limit representing trunk circuit #10, then pawl 156 will be forced into the extreme left-hand tooth of rack 146, thus locking carriage 136 in the position representing trunk circuit #10.

As previously indicated, carriage 136 can be stopped at any trunk circuit position intermediate the left-hand location limit and the right-hand location limit. This is accomplished by holding lock magnet 147 energized until carriage 136 arrives at the desired trunk circuit position and then immediately de-energizing lock magnet 147. The de-energization of lock magnet 147 causes pawl 156 to be forced into the tooth of rack 146 representing the selected trunk circuit position, to lock carriage 136 against further linear movement. The manner in which lock magnet 147 is controlled for stopping carriage 136 at the selected trunk circuit position is described in connection with the circuit operation explanation to be found in a later portion of this specification.

Finger members 126, 127, of master switch 135 are pivotally mounted at 128, 129, on carriage 136, and extend downwardly over lever assembly 105 of lineswitch 120 for causing linear movements of lever assembly 105 to the right or to the left, as carriage 136 is moved to the right or to the left. Fingers 126, 127, are coupled together by means of spring 132, the normal tension of which draws fingers 126, 127, towards each other until finger 126 rests against stop pin 130 fixed to carriage 136, and finger 127 rests against stop pin 131 also fixed to carriage 136. At the same time, the extreme free ends of fingers 126, 127, engage opposite sides of a guide pin 134 secured to lever assembly 105 for the purpose of transmitting linear movements of carriage 136 to lever assembly 105.

The just described arrangement of fingers 126, 127, stop pins 130, 131, and guide pin 134 is the arrangement of these elements when the associated lineswitch 120 is in its normal non-operated condition, with lever assembly 105 retaining actuators 201, 202, in alignment with, but clear of, the vertically disposed line circuit conductors associated with the vertically disposed conductors of a free trunk circuit. In Figure 1, the free trunk circuit is trunk circuit #1 and, therefore, lineswitch 120 is "aligned" with trunk circuit #1, in preparation for extending the line circuit associated with lineswitch 120 to trunk circuit #1, should a call be initiated over said line circuit.

The manner in which lever assembly 105 of lineswitch 120 is moved to the right will now be explained. Assuming that carriage 136 is in the left-hand location limit position as shown in Figure 1 and that lock magnet 147 and solenoid 137 became energized, then carriage 136 is caused to move to the right-hand location limit by the pulling power of solenoid 137. As carriage 136 moves to the right, finger 126, 127, are obviously carried along with carriage 136, spring 132 holding fingers 126, 127, against the respective stop pins 130, 131. Finger 126 presses against guide pin 134 secured to lever assembly 105 and, since lever assembly 105 is free to move because pawl 116 is clear of the first tooth of rack 106, finger 126 moves lever assembly 105 to the right.

Assuming now that carriage 136 is in the right-hand location limit position corresponding to trunk circuit #10, that solenoid 137 remains de-energized, and that lock magnet 147 becomes energized, then carriage 136 is caused to move to the left by the driving power of spring 138. As carriage 136 moves to the left, fingers 126, 127, are carried along with carriage 136, spring 132 in this instance also holding fingers 126, 127, against the respective stop pins 130, 131. Finger 127 presses against guide pin 134 secured to lever assembly 106 and, since lever assembly 105 is free to move because pawl 116 is clear of the tenth tooth of rack 106, finger 127 moves lever assembly 105 to the left.

The foregoing description concerns the arrangement and functioning of master switch 135 primarily with respect to lineswitch 120. It, however, also applies to lineswitches 125 and 130 with the general exceptions that lineswitch 125 is shown "plunged" into trunk circuit #5, and lineswitch 130 into trunk circuit #10. Hence, when carriage 136 is moved to the right from the position shown in Figure 1, lever assemblies 160 and 165 of lineswitches 125 and 130 are not carried along because the pawl of lever assemblies 160 and 165 are held in the fifth and tenth tooth positions of racks 166 and 167 respectively by the continued energization of the magnets of lineswitches 125 and 130. Fingers 176, 177, associated with lever assembly 160 and fingers 186, 187, associated with lever assembly 165, however, are carried along with the carriage 136 but do not move the respective lever assemblies 160 and 165 for the reasons given in the following three paragraphs.

Lineswitch 125 is shown "plunged" into trunk circuit #5 which means that, prior to the plunging, fingers 176, 177, had carried guide pin 174 of lever assembly 160 along until the actuators of lever assembly 160 became aligned with the vertically disposed conductors in multiple field 150 associated with trunk circuit #5. Subsequently, the initiation of a call over the line circuit associated with lineswitch 125 caused the plunging into trunk circuit #5. Since the main function of master switch 135 is to "align" the lever assemblies of all lineswitches in the normal, or unused, positions with a free trunk circuit in multiple field 150, it follows that when lineswitch 125 "plunged" into trunk circuit #5, the lever assemblies of all unused lineswitches were then "aligned" with a free trunk circuit. A similar situation also existed in the case of lineswitch 130 with respect to trunk circuit #10.

Considering now the action of fingers 176, 177, associated with lineswitch 125 with respect to the moving of carriage 136 to the right from the position shown in Figure 1, finger 177 is held against the right-hand side of guide pin 174 and finger 176 against stop pin 170 by the pulling power of spring 172. As carriage 136 moves to the right from the left-hand location limit, fingers 176, 177, are carried along. The free end of finger 176 correspondingly approaches the left-hand side of guide post 174, and stop pin 171 approaches finger 177. Should the movement continue until the actuators of all unaligned lever assemblies pass the vertically disposed conductors of trunk circuit #5, then finger 176 will come into contact with the left-hand side of guide pin 174. The contacting of finger 176 with guide pin 174, however, will not cause a movement of lever assembly 160 to the right because the pawl of lever assembly 160 is firmly held in the fifth tooth position of rack 106 by the continued energization of the magnet of lineswitch 125. At the midpoint of the travel of carriage 136, both fingers 176, 177, will be in contact with guide pin 174 and with the respective stop pins 170, 171, in the manner shown in Figure 1 for fingers 126, 127. Should the travel to the right be continued, then finger 176 will be held in contact with guide pin 174, and stop pin 171 will urge the free end of finger 177 away from guide pin 174, spring 172 being flexed accordingly. When carriage 136 arrives at the right-hand location limit, finger 176 will still be in contact with guide pin 174 and finger 177 with stop pin 171. When carriage 136 is moved to the left from the right-hand location limit, the action of fingers 176, 177, will be reversed to that just described.

The action of fingers 186, 187, associated with lineswitch 130 with respect to the moving of carriage 136 to the right from the position shown in Figure 1 would be similar to that described in the preceding paragraph for fingers 176, 177, with the general difference that the free end of finger 186 would not reach guide pin 184 until carriage 136 arrives at the right-hand location limit.

When a call is initiated over a line circuit associated with an unused lineswitch, such as 120, said lineswitch "plunges" into the previously selected trunk circuit, such as trunk circuit #1, to connect said line circuit with the selected trunk circuit. Now in order that master switch 135 can then automatically select another free trunk circuit and "align" the lever assemblies of any unused lineswitches with this free trunk circuit, the following means are associated with carriage 136 for controlling the movements of carriage 136.

Figure 5:
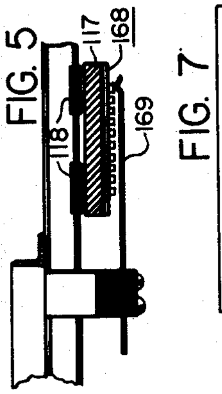
Figure 5 is a fragmentary cross-section taken along the line 5—5 in Figure 1 to show the mounting relationship of a bank of 10 contacts and the co-operating test wiper.

A bank 168 of 10 contacts (one contact for each of the 10 trunk circuits #1 to 10 inclusive) is suitably mounted on carriage 136 as shown in Figures 1 and 5. Contact #1 at the right of bank 168 is wired to one of the vertically disposed conductors of trunk circuit #1, contact #2 of bank 168 to one of the vertically disposed conductors of trunk circuit #2, etc. A test wiper 169 for cooperating with bank 168 is insulatingly mounted on a member of frame 110 to the left of carriage 136, also as shown in Figures 1 and 5. Figure 7 shows the wiring of test wiper 169. It is obvious that the locations of bank 168 and test wiper 169 can be interchanged, i. e., bank 168 can be mounted on framework 110, and test wiper 169 on carriage 136.

The controlling means for carriage 136 further includes a contact spring assembly 173, a trip spring 175, an actuator 178, a trip magnet assembly 180, and a relay 185, all wired as shown in Figure 7. Contact spring assembly 173 is suitably mounted on a member of frame 110 just to the left of carriage 136 when carriage 136 is in the position shown in Figure 1. Actuator 178, the ends of which are of insulating material, is so mounted on carriage 136 that its left end is just clear of contact spring assembly 173 when carriage 136 is in the position shown in Figure 1, and its right end extends slightly to the right of carriage 136. Trip magnet 180 is suitably mounted on a member of frame 110 somewhat to the right of carriage 136 when carriage 136 is at the right-hand location limit (trunk circuit #10 position). Trip spring 175 is suitably mounted on frame 110 just above trip magnet 180 and is normally tensioned towards trip magnet 180. Trip spring 175 is operated upwardly only when the right-hand end of actuator 178 passes underneath it, which action occurs just as carriage 136 reaches the trunk circuit #10 position. Relay 185 is mounted on any convenient member of frame 110, such as shown in Figure 1.

Having described the mechanical arrangement and functionings of the present invention, a detailed explanation of its circuit operation will now be given, reference being had to Figures 6 and 7.

Referring first to Figure 6, this diagram illustrates a typical subscriber line circuit associated with one of the lineswitches, such as 120, in its normal relationship with the four conductors of a trunk circuit, such as trunk circuit #1, i. e., actuators 201 and 202 of lineswitch 120 are "aligned" with the four conductors of trunk circuit #1. It should be understood, however, that actuators 201 and 202 can be "aligned" with the four conductors of any of the other trunk circuits #2 to #10 inclusive and, therefore, lineswitch 120 can also have a normal relationship with any of the other nine trunk circuits. It should also be understood that all of the subscriber line circuits and the associated lineswitches are arranged in a manner similar to that shown in Figure 6, only one line circuit, one lineswitch and the four conductors of one trunk circuit being shown in order to simplify the diagram.

At the left of Figure 6 is shown a subscriber telephone in block form, at the right the four conductors 151—154 of trunk circuit #1, and in the center portion the various elements of lineswitch 120. In the elevation figures of the drawings, the four conductors of trunk circuit #1 are located in a plane at a right angle to the plane of lineswitch 120, but in Figure 6 the four trunk circuit conductors 151—154 are shown in the plane of lineswitch 120 to further simplify the diagram. Actuators 201 and 202 of lineswitch 120 are correspondingly shown in the plane of lineswitch 120.

Now assuming that a call is initiated at the telephone of Figure 6, then the circuit of line relay 100 is completed over the telephone loop in conventional manner. Line relay 100 operates and completes an obvious circuit to one winding of magnet 101, causing magnet 101 to operate. This completes the function of line relay 100. In passing, it should be understood that since line relay 100 performs no mechanical functions related to the units shown in Figures 1, 2 and 3, line relay 100 can be mounted on a frame independent of frame 110, or line relay 100 can be mounted on frame 110 at any convenient location in association with lineswitch 120.

Armature 104 of magnet 101 pivots at 103 and causes member 109 to drive pawl 116 of lever assembly 105 into the first tooth (corresponding to trunk circuit #1) of rack 106. At the same time, magnet 101 opens the loop circuit of line relay 100 at contact assembly 108, but line relay 100 is of the slow-to-release type and, therefore, the circuit from line relay 100 to the one winding of magnet 101 is maintained for a short period of time thereafter. Responsive to the driving of pawl 116 into the first tooth of rack 106, lever assembly 105 pivots at 112 thereby driving actuators 201 and 202 upwardly. Actuator 201 urges spring conductors 191, 192, of the line circuit into sliding contacts with conductors 151, 152, thereby extending the line circuit to the negative and positive operating conductors of trunk circuit #1.

Actuator 202 urges spring conductors 193, 194, of the line circuit into sliding contacts with conductors 153, 154, of trunk circuit #1. Assuming that ground potential is returned over trunk conductor 153 as one result of the "seizing" of operating conductors 151, 152, then this ground potential is extended to the second winding of magnet 101 by spring conductor 193 to retain magnet 101 energized as line relay 100 restores and opens the circuit to the first winding of magnet 101. Magnet 101 remains in the operated position as long as the telephone of the line circuit loops the operating conductors 151, 152, of trunk circuit #1. Spring conductor 194 extends ground potential to trunk conductor 154 and thereby to conductor 188 leading to the contact of bank 168 (Figure 7) related to trunk circuit #1 for marking that trunk circuit #1 has been taken into use.

Referring next to Figure 7, this diagram illustrates the manner in which master switch 135 of Figure 1 is caused to select another free trunk circuit when trunk circuit #1 is taken into use by lineswitch 120 as outlined in the preceding explanation of Figure 6. Only sufficient details of the controlling means are shown in Figure 7 to enable the arrangement to be understood, and the lineswitches and the related lever assemblies have been omitted in order to simplify the diagram.

The ground potential sent out over conductor 188 from Figure 6 is extended by wiper 169 in contact with the contact representing trunk circuit #1 in bank 168 to relay 185, causing relay 185 to operate. At armature 189, relay 185 completes an obvious circuit to lock magnet 147, causing lock magnet 147 to operate and thereby withdraw pawl 156 from rack 146. Carriage 136 is now free to move and power spring 138, therefore, drives carriage 136 slightly to the left so that the left end of actuator 178 closes contact 173 while wiper 169 still remains on the right-hand contact of bank 168.

The closing of contact 173 completes a circuit for trip magnet 180 from ground, armature 189, contact 173, winding of trip magnet 180, contact 159 to battery, causing trip magnet 180 to operate. At armature spring 181, trip magnet 180 extends ground potential to solenoid 137, and, at armature spring 182, extends ground potential to relay 185 thereby to lock relay 185 in the operated position. As armature 183 operates in response to the energization of trip magnet 180, it urges armature spring 181 to the left into contact with the ground potential spring and, at the same time, causes the tip end of armature spring 181 to slip behind latch 179 of trip spring 175 thereby to lock armature springs 181 and 182 in contact with the ground potential spring.

Solenoid 137 energizes from the ground potential over armature spring 181 and, since lock magnet 147 remains in the operated position because of the continued energization of relay 185, solenoid 137 draws carriage 136 to the right against the increasing tension of power spring 138. Carriage 136 travels smoothly and at a uniform rate of speed to the right under regulation of its governor (not shown). In the meantime, contact is broken between wiper 169 and the bank contact representing trunk circuit #1, but pawl 156 is kept clear of rack 146 by the operated lock magnet 147 and, therefore, solenoid 137 continues to draw carriage 136 towards the right-hand location limit (trunk circuit #10 position). Contact 173 is also opened by the movement of carriage 136 to the right thereby de-energizing trip magnet 180, but the armature springs 181, 182, are retained in an operated position by latch 179 of trip spring 175.

As carriage 136 reaches the right-hand location limit (trunk circuit #10 position), the bank contact corresponding to trunk circuit #10 connects with wiper 169. Since in Figure 1 line-switch 130 is shown occupying trunk circuit #10, there will obviously be ground potential on the bank contact corresponding to trunk circuit #10, and this ground potential will be relayed via wiper 169 to the winding of relay 185. This constitutes an additional locking circuit for relay 185 which is holding lock magnet 147 energized. Solenoid 137, consequently, pulls carriage 136 slightly further to the right to be completely established on the trunk circuit #10 position. In this additional movement to the right, the right end of actuator 178 slides underneath the tip of trip spring 175, raising tip spring 175 upwardly sufficiently to withdraw latch 179 from the tip of armature spring 181, this permitting armature springs 181 and 182 to restore.

The restoration of armature springs 181—182 open the circuit of solenoid 137 and one locking circuit of relay 185. Relay 185, however, is held operated for the time being over the multiple locking circuit via wiper 169 and, therefore, lock magnet 147 continues to hold pawl 156 free of rack 146. The de-energization of solenoid 137 permits power spring 138 to drive carriage 136 to the left towards the left-hand location limit.

As carriage 136 leaves trunk circuit #10 position and reaches trunk circuit #9 position (the next position to the left of trunk circuit #10 position), contact is broken between wiper 169 and the bank contact of trunk circuit #10, and contact is made between wiper 169 and the bank contact of trunk circuit #9. Assuming now that trunk circuit #9 is free, then there is no ground potential on the bank contact of trunk circuit #9 and, consequently, the last remaining holding circuit for relay 185 will be opened at wiper 169. Relay 185 restores, opening the circuit to lock magnet 147 and thus causing lock magnet 147 to restore. The retraction of the armature of lock magnet 147 by spring 157 causes member 148 to force pawl 156 into the tooth position of rack 146 corresponding to trunk circuit #9, and carriage 136 is locked in trunk circuit #9 position. It should be understood that the lever assemblies of all unused lineswitches on frame 110 were carried along with carriage 136 in its just described movements to the right and then to the left, thus "aligning" all unused lineswitches with trunk circuit #9.

Assuming now that instead of trunk circuit #9 being free when wiper 169 tests the bank contact of trunk circuit #9, it was previously occupied. Ground potential, therefore, is extended from the bank contact of trunk circuit #9 to relay 185 through wiper 169 and, therefore, relay 185 remains operated. Lock magnet 147 also remains energized, and power spring 138 drives carriage 136 from trunk circuit #9 position to trunk circuit #8 position. In like manner, wiper 169 tests trunk circuit #8 position, and should trunk circuit #8 position be busy, carriage 136 is driven to trunk circuit #7 position, etc. If no trunk circuit below trunk circuit #8 position tests free, then carriage 136 is brought back to trunk circuit #10 position by solenoid 137 in the manner previously explained, and testing of trunk circuit #10 and down begins again until a free trunk circuit is found.

It should be understood at this time that any well-known conventional method for preventing a master switch from useless searching when a free trunk circuit is not available, can also be applied to the present invention. It should be further understood that any well-known conventional method for preventing the energization of more than one line circuit magnet, such as 101, due to calls being initiated simultaneously can also be applied to the present invention. Since such preventive measures are not part of the present invention, however, it is considered unnecessary to include the details in this specification.

From the foregoing specification and associated drawings, it will be readily seen that an exceedingly simple and novel non-numerical type line-switch has been devised, and that new and novel switching arrangements for use with a multiple field of bare conductors have been developed.

While there has been described what is at present considered to be the preferred embodiment of the invention, it should be understood that various modifications may be made in the structure thereof, and it is contemplated in the appended claims to cover all such modifications as fall within the true spirit and scope of the invention.

What is claimed is:

1. In a switching arrangement, movable conductors arranged in a flat plane of parallel rows, two levers each adapted to have a linear movement and a pivoted movement, two actuators, means for operatively aligning both said actuators with one of said conductors, means for causing a pivoted movement of one of said levers, said pivoted movement of said one lever causing one of said actuators to move said one conductor, means responsive to said moving of said one conductor for causing a linear movement of said other lever across said conductors to operatively align said other actuator with another one of said conductors.

2. The switching arrangement claimed in claim 1 together with means for thereafter causing a pivoted movement of said other lever, said pivoted movement of said other lever causing said other actuator to move said other conductor.

3. The switching arrangement claimed in claim 1 together with means for disabling said pivoted movement of said one lever to retract said one actuator from said one conductor, and means responsive to said retraction of said one actuator for causing a linear movement of said one lever across said conductors to operatively align said one actuator with said other conductor.

4. In a switching arrangement, movable conductors arranged in a flat plane of parallel rows, two levers each adapted to have a pivoted movement and a linear movement in both of opposite directions, two actuators, means for operatively aligning both said actuators with one of said conductors, means for causing a pivoted movement of one of said levers, said pivoted movement of said one lever causing one of said aligned actuators to move said one conductor, means responsive to said moving of said one conductor for causing a linear movement of said other lever across said conductors in one direction to disassociate said other actuator from operative alignment with said one conductor, means responsive to said linear movement of said other lever for causing another linear movement of said other lever across said conductors but in the opposite direction to operatively align said other actuator with another one of said conductors.

5. The switching arrangement claimed in claim 4 together with means for lastly causing a pivoted movement of said other lever, said other actuator caused to move said other conductor responsive to said pivoted movement of said other lever.

6. The switching arrangement claimed in claim 4 together with means for disabling said pivoted movement of said one lever to retract said one actuator from said one conductor, and means responsive to said retraction of said one actuator for causing a linear movement of said one lever in only one of said opposite directions to operatively align said one actuator with said other conductor.

7. In a switching device, the combination of a straightline lever having a contact actuator at or near one end and a pawl at or near the other end, said lever adapted to be moved in a linear direction for locating said actuator in any one of a plurality of contact operating positions, said lever also adapted to be rotated at an angle to its axis for moving said actuator in the plane of any one of said contact operating positions, a rack having a plurality of teeth corresponding to said plurality of contact operating positions, means for maintaining said pawl clear of said teeth of said rack to permit a linear movement of said lever, means for causing a linear movement of said lever to locate said actuator in one of said plurality of contact operating positions, an electromagnet, means for energizing said magnet, an armature operatively associated with said magnet, said armature having a member, said armature operated responsive to an energization of said magnet for causing said member to disable said maintaining means and to force said pawl of said lever into the tooth of said rack corresponding to said one contact operating position, thereby to cause a rotative movement of said linearly moved lever, said rotative movement of said linearly moved lever moving said actuator in the plane of said one contact operating position.

8. In a switching arrangement, a plurality of stationary bare conductors arranged in groups of at least four conductors each, said groups of stationary conductors being located in parallel planes of one group each, a plurality of movable conductors arranged in groups corresponding to said groups of stationary conductors and being so located in said planes that each of said movable conductors is adjacent one of said stationary conductors, a lever adapted to have a linear movement and a pivoted movement, at least two actuators attached to said lever, means for causing a linear movement of said lever through said plane groups to operatively align one of said actuators with certain of said movable conductors of one of said plane groups and to operatively align another of said actuators with other of said movable conductors of said one plane group, thereby to select said one plane group, electrically operated means for thereafter causing a pivoted movement of said lever, said pivoted movement of said lever causing said aligned actuators to respectively move said certain movable conductors and said other movable conductors of said selected plane group into contact with the respectively adjacent stationary conductors of said selected plane group.

9. The combination of a plurality of passive bare conductors arranged in a flat plane of parallel rows, a plurality of active bare conductors arranged in a flat plane of parallel rows, each of said active conductors being adjacent one of said passive conductors and adapted to be moved into contact therewith, an element adapted to be moved in both of opposite linear directions and to be rotated at an angle to its axis, an actuator on said element aligned operatively with one of said active conductors, means for causing one of said conductors to engage its passive conductor, means responsive to the contacting of said one of said passive conductors by its adjacent active conductor for causing a movement of said element transversely of said active conductors in one of said opposite directions to dissassociate said actuator from said one active conductor, means effective at the end of said transverse movement for then causing a movement of said moved element transversely of said active conductors in the other of said opposite directions to align said actuator operatively with another of said active conductors, and means for causing a rotative movement of said twice moved element, said re-aligned actuator responsive to said rotative movement of said element to urge said other active conductor into contact with the adjacent passive conductor.

10. The combination as claimed in claim 9 wherein said first mentioned means includes an operated electromagnet as the motive power for said first transverse movement of said element, and wherein said second mentioned means includes a power spring tensioned by said operated magnet as the motive power for said second transverse movement of said element.

JOHN WICKS.

References Cited in the file of this patent

UNITED STATES PATENTS

| Number | Name | Date |
|---|---|---|
| 2,052,059 | Sengebusch | Aug. 25, 1936 |
| 2,433,256 | Baker | Dec. 23, 1947 |